US009739500B2

(12) United States Patent
Wang

(10) Patent No.: US 9,739,500 B2
(45) Date of Patent: Aug. 22, 2017

(54) AIR PURIFICATION APPARATUS

(71) Applicant: KONINKLIJKE PHILIPS N.V., Eindhoven (NL)

(72) Inventor: Weiran Wang, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/646,204

(22) PCT Filed: Nov. 21, 2013

(86) PCT No.: PCT/IB2013/060303
§ 371 (c)(1),
(2) Date: May 20, 2015

(87) PCT Pub. No.: WO2014/083482
PCT Pub. Date: Jun. 5, 2014

(65) Prior Publication Data
US 2015/0300677 A1    Oct. 22, 2015

(30) Foreign Application Priority Data

Nov. 27, 2012 (WO) ................ PCT/CN2012/085350

(51) Int. Cl.
*F24F 11/053* (2006.01)
*B01D 46/44* (2006.01)
(Continued)

(52) U.S. Cl.
CPC ........ *F24F 11/053* (2013.01); *B01D 46/4236* (2013.01); *B01D 46/448* (2013.01);
(Continued)

(58) Field of Classification Search
CPC ........ F24F 11/053; F24F 3/1603; F24F 7/013; F24F 2003/1614; F24F 12/006;
(Continued)

(56) References Cited

U.S. PATENT DOCUMENTS 1,295,417 A    2/1919    Boerner
4,295,417 A    10/1981   Isley
(Continued)

FOREIGN PATENT DOCUMENTS

CN    101377114 A    3/2009
CN    201288478 Y    8/2009
(Continued)

*Primary Examiner* — Christopher P Jones
*Assistant Examiner* — Britanny Precht

(57) ABSTRACT

The invention relates to an air purification apparatus. The apparatus is disposed in a window for separating an indoor space and an outdoor space. The apparatus comprising: an inlet chamber having a first inlet, a second inlet and an outlet, wherein the first inlet is operatively open to the outdoor space and the second inlet is operatively open to the indoor space; an air pumping unit for pumping air from the inlet chamber to the indoor space through the outlet, wherein the air is pumped into the inlet chamber through the first inlet or through the second inlet; and a filtering unit disposed upstream of the air pumping unit, for filtering pollutants in the air.

15 Claims, 8 Drawing Sheets

(51) Int. Cl.
  *F24F 3/16* (2006.01)
  *B01D 46/42* (2006.01)
  *F24F 11/00* (2006.01)
  *E06B 7/02* (2006.01)
  *F24F 7/013* (2006.01)

(52) U.S. Cl.
  CPC ............... *E06B 7/02* (2013.01); *F24F 3/16* (2013.01); *F24F 3/1603* (2013.01); *F24F 7/013* (2013.01); *F24F 11/0001* (2013.01); *F24F 11/0012* (2013.01); *E06B 2007/023* (2013.01); *F24F 2003/1614* (2013.01); *F24F 2221/20* (2013.01)

(58) Field of Classification Search
  CPC ... F24F 13/18; B01D 46/4236; B01D 46/448; E06B 7/02; E06B 7/10
  See application file for complete search history.

(56) References Cited

U.S. PATENT DOCUMENTS

| | | | | |
|---|---|---|---|---|
| 4,330,021 A * | 5/1982 | Deering | | 160/91 |
| 4,478,053 A * | 10/1984 | Yano | | F24F 1/027 62/262 |
| 4,535,684 A * | 8/1985 | Perng | | 454/185 |
| 4,560,395 A * | 12/1985 | Davis | | 96/381 |
| 4,685,615 A * | 8/1987 | Hart | | G05D 23/1902 165/11.1 |
| 4,811,897 A * | 3/1989 | Kobayashi | | F24F 3/00 165/217 |
| 5,228,306 A * | 7/1993 | Shyu | | F24F 1/027 236/49.3 |
| 5,417,727 A * | 5/1995 | Bowen et al. | | 96/386 |
| 5,531,801 A * | 7/1996 | Sewell | | B01D 47/06 95/10 |
| 6,062,296 A * | 5/2000 | Broberg | | 165/6 |
| 6,209,622 B1 * | 4/2001 | Lagace et al. | | 165/8 |
| 6,241,600 B1 * | 6/2001 | Uehara | | 454/252 |
| 6,575,228 B1 * | 6/2003 | Ragland et al. | | 165/54 |
| 6,641,364 B1 * | 11/2003 | Lee | | 415/208.3 |
| 2004/0244401 A1 * | 12/2004 | Lee et al. | | 62/411 |
| 2004/0253917 A1 * | 12/2004 | Kim et al. | | 454/200 |
| 2005/0167077 A1 * | 8/2005 | Matsugi et al. | | 165/4 |
| 2005/0269057 A1 * | 12/2005 | Lee et al. | | 165/9.3 |
| 2005/0287945 A1 * | 12/2005 | Choi et al. | | 454/234 |
| 2007/0000467 A1 * | 1/2007 | Shaw et al. | | 123/184.53 |
| 2010/0197214 A1 * | 8/2010 | Geremia et al. | | 454/195 |
| 2013/0319632 A1 * | 12/2013 | Lee | | 165/59 |

FOREIGN PATENT DOCUMENTS

| | | |
|---|---|---|
| CN | 202055729 U | 11/2011 |
| CN | 102297477 A | 12/2011 |
| DE | 2702214 A1 | 7/1978 |
| EP | 1498568 A1 | 1/2005 |
| EP | 1795691 A1 | 6/2007 |
| JP | 2005068907 A | 3/2005 |
| TW | 201132368 A | 10/2011 |

* cited by examiner

AIR PURIFICATION APPARATUS

This application is the U.S. National Phase application under 35 U.S.C. §371 of International Application No. PCT/IB2013/060303, filed on Nov. 21, 2013, which claims the benefit of International Application No. PCT/CN2012/085350 filed on Nov. 27, 2012. These applications are hereby incorporated by reference herein.

FIELD OF THE INVENTION

The invention generally relates to air purification technology, and more particularly relates to an air purification apparatus.

BACKGROUND OF THE INVENTION

Air purification apparatuses have been widely used in many circumstances, such as offices, workshops or medical facilities, for removing pollutants in air and providing purified air to people. The air purification apparatuses typically comprise a filtration component, which collects the pollutants, such as solid particles or organic pollutants, when air flows therethrough. However, the conventional air purification apparatuses are generally disposed in indoor spaces, and therefore they can only be used to purify indoor air. When the indoor air quality is poor, such air purification apparatus cannot produce clean air as required because the filtration capability of the filtration component is limited.

SUMMARY OF THE INVENTION

It would be, therefore, advantageous to provide an air purification apparatus capable of introducing outdoor air into the indoor space as its air source.

According to an embodiment of the invention, there is provided an air purification apparatus, which is disposed in a window for separating an indoor space and an outdoor space. The apparatus comprises: an inlet chamber having a first inlet, a second inlet and an outlet, wherein the first inlet is operatively open to the outdoor space and the second inlet is operatively open to the indoor space; an air pumping unit for pumping air from the inlet chamber to the indoor space through the outlet, wherein the air is pumped into the inlet chamber through the first inlet or through the second inlet; and a filtering unit disposed upstream of the air pumping unit, for filtering pollutants in the air.

In some embodiments of the invention, the air purification apparatus can choose either the outdoor air or the indoor air as its air source by selectively opening the first inlet or the second inlet, for example, according to the indoor and outdoor air quality. Therefore, the consumers can control the air source of the air purification apparatus, which is especially effective when the outdoor air quality is better than the indoor air quality. Moreover, it is easy to integrate such air purification apparatus into a window.

In an embodiment, the inlet chamber has a groove on at least a portion of its inner wall, and the filtering unit has a filter screen covering the groove to form an air channel in fluid communication with the outlet. The air channel may be formed all around the inner wall of the inlet chamber instead of merely on one side of the inlet chamber on which the air pumping unit is disposed, which helps to reduce the flow resistance of the air pumping unit. In this way, the ventilation capability of the air purification apparatus can be significantly improved.

In an embodiment, the filter screen is a HEPA filter. The HEPA (High Efficiency Particulate Air) filter can be used to filter micro particulate matters in the air.

In an embodiment, the filter screen is disposed on a top side and/or a lateral side of the inner wall of the inlet chamber. Such configured, rain drops will not fall onto the filter screen and then accumulate thereon, thereby preventing the filter screen from water corrosion.

In an embodiment, the air pumping unit is a centrifugal fan or an axial fan.

In an embodiment, the air purification apparatus further comprises: an outlet chamber disposed downstream of the air pumping unit, wherein the outlet chamber has a noise reducer for reducing noise when the air is pumped into the indoor space through the outlet chamber. This apparatus can be easily integrated into the window which is mainly consisted of double-wall glass. Moreover, the noise reducer can be used to reduce outdoor noise when the first inlet is open to the outdoor space.

In an embodiment, the air pumping unit is disposed between the inlet chamber and the outlet chamber. It is easy and inexpensive to implement such apparatus in the window.

In an embodiment, the air purification apparatus further comprises: a first cover for operatively sealing the first inlet; a second cover for operatively sealing the second inlet; and an actuator for operatively driving the first cover the seal the first inlet or driving the second cover to seal the second inlet. With the actuator, the air purification apparatus can be automatically switched to operate under different operation modes.

In an embodiment, the air purification apparatus further comprises: an air condition sensor for sensing air condition of the indoor space and the outdoor space; and a first controller for controlling the actuator to seal the first inlet or the second inlet according to the sensed air condition. The air purification apparatus can automatically choose the indoor air or the outdoor air as the air source according to the sensed air quality.

In an embodiment, the first controller is further configured to control the working of the air pumping unit according to the sensed air condition. Accordingly, the air ventilation of the air purification apparatus can be automatically adjusted.

In an embodiment, the air purification apparatus further comprises: a temperature sensor for sensing air temperature of the indoor space and the outdoor space; and a second controller for controlling the actuator to seal the first inlet or the second inlet according to a temperature difference between the indoor space and the outdoor space.

In an embodiment, the air purification apparatus further comprises: an air conditioning unit for adjusting the air temperature of the indoor space according to the sensed air temperature.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 1:
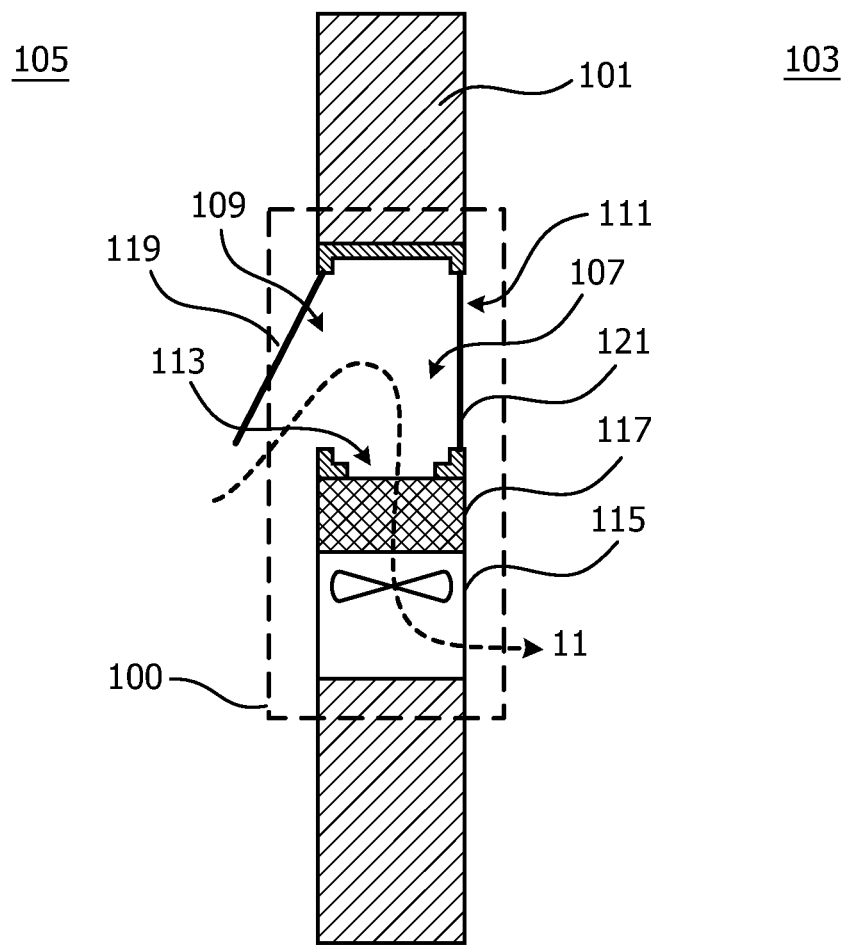
FIGS. 1 and 2 depict an air purification apparatus 100 according to an embodiment of the invention.
Figure 2:
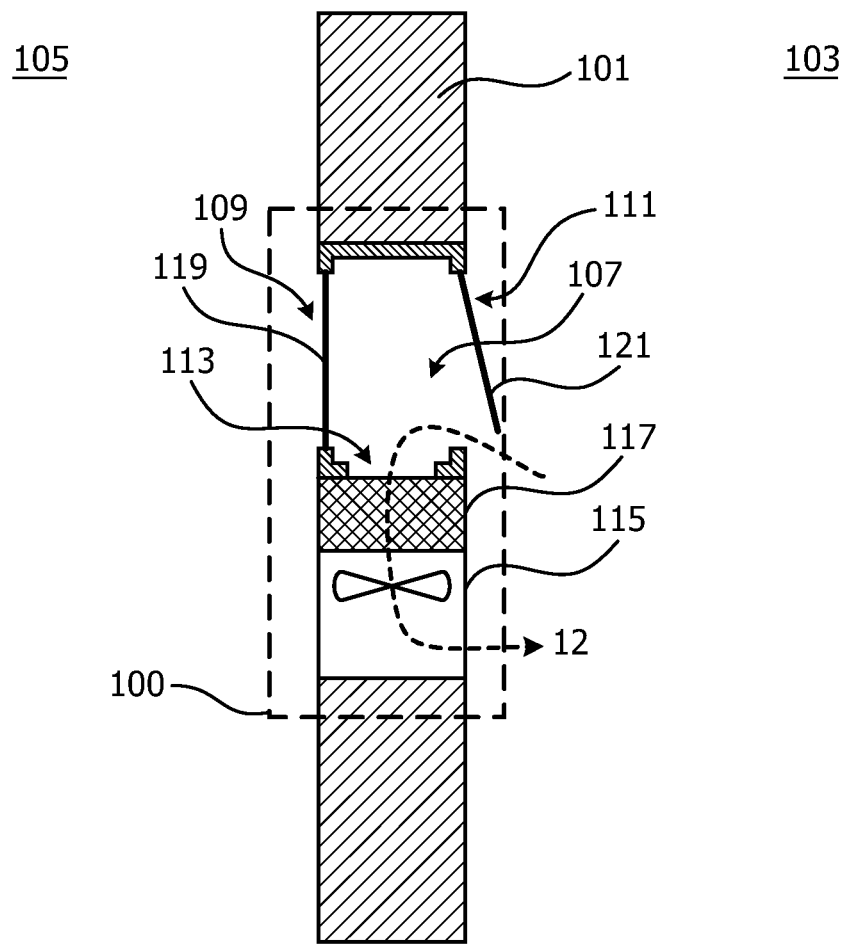

FIGS. 1 and 2 depict an air purification apparatus 100 according to an embodiment of the invention. The air purification apparatus 100 is used to remove pollutants in air, such as solid particles or organic pollutants (e.g. formaldehyde, toluene or other highly volatile hydrocarbons), and to produce clean air for people. In the embodiment, the air purification apparatus 100 is disposed in a window 101 for separating an indoor space 103 and an outdoor space 105.

As depicted in FIGS. 1 and 2, the air purification apparatus 100 comprises:

- an inlet chamber 107 having a first inlet 109, a second inlet 111 and an outlet 113, wherein the first inlet 109 is operatively open to the outdoor space 105 and the second inlet 111 is operatively open to the indoor space 103;
- an air pumping unit 115 for pumping air from the inlet chamber 107 to the indoor space 103 through the outlet 113, wherein the air is pumped into the inlet chamber 107 through the first inlet 109 or through the second inlet 111; and
- a filtering unit 117 disposed upstream of the air pumping unit 115, for filtering pollutants in the air.

Depending on which of the first inlet 109 and the second inlet 111 is selected as an air source for importing air, the operation of the air purification apparatus 100 may be classified into two modes. Specifically, when the first inlet 109 is open to the outdoor space 105 and the second inlet 111 is closed, the air purification apparatus 100 operates under Mode 1. Under Mode 1, the outdoor air is imported into the inlet chamber 107 and then purified by the filtering unit 117, as is illustrated in FIG. 1. Otherwise, when the second inlet 111 is open to the indoor space 105 and the first inlet 109 is closed, the air purification apparatus 100 operates under Mode 2. Under Mode 2, the indoor air is imported into the inlet chamber 107, as is illustrated in FIG. 2.

In the embodiment, the air purification apparatus 100 has a first cover 119 for operatively sealing the first inlet 109, and a second cover 121 for operatively sealing the second inlet 111. The first cover 119 and the second cover 121 may be formed of glass, which permits light, such as sunshine, transmit into the indoor space 103. The first cover 119 may be manually or mechanically moved between an open position away from the first inlet 109 and a closed position engaging and sealing the first inlet 109. Similarly, the second cover 121 may be manually or mechanically moved between an open position away from the second inlet 111 and a closed position engaging and sealing the second inlet 111. In this way, the operation mode of the air purification apparatus 100 may be switched between Mode 1 and Mode 2 accordingly. In some examples, the apparatus 100 may further comprise an actuator (not shown) such as a motor, for operatively driving the first cover 119 to seal the first inlet 109 or driving the second cover 121 to seal the second inlet 111. The actuator may be responsive to an internal or external control signal to drive the first cover 119 and/or the second cover 121.

In the embodiment in FIGS. 1 and 2, the air pumping unit 115 is disposed outside the inlet chamber 107 and downstream of the outlet 113. In some other examples, the air pumping unit 115 may be disposed inside the inlet chamber 107. For example, the air pumping unit 115 may be disposed both within a first air flow path 11 in FIG. 1 and a second air flow path 12 in FIG. 2, to generate and maintain the air flow in the air purification apparatus 100. In detail, the first air flow path 11 fluidly couples the first inlet 109 and the outlet 113, and the second air flow path 12 fluidly couples the second inlet 111 and the outlet 113. In some examples, the air pumping unit 115 is capable of generating an outlet pressure at the outlet 113, which is lower than an inlet pressure at the first inlet 109 or at the second inlet 111. In this way, the outdoor air may be pumped into the indoor space 103 in the first air flow path 11 under Mode 1, or the indoor air may be pumped into the indoor space 103 in the second air flow path 12 under Mode 2. For example, the air pumping unit 115 may be a centrifugal fan, an axial fan or an air pump. It will be readily appreciated that, the air pumping unit 115 may apply some other mechanism for generating the air flow. For example, the air pumping unit 115 may be an ionic wind generator, which ionizes some gas molecules in the air into ions, and then drives the air with ions to flow by using electric field.

When air in the air purification apparatus 100 flows in the first air flow path 11 or in the second air flow path 12, it will flow through the filtering unit 117 upstream of the air pumping unit 115. Such configured, the pollutants can be collected in the filtering unit 117 and then removed from the air outputted by the air purification apparatus 100. The filtering unit 117 may be a HEPA filter, an active carbon filter, or other types of gas filters. The HEPA filter is highly effective in filtering micro particulate matters in the air, and the active carbon filter is effective in absorbing organic pollutants, such as formaldehyde or toluene, in the air. In the embodiment, the filtering unit 117 is disposed between the outlet 113 of the inlet chamber 107 and the air pumping unit 115. For example, the outlet 113 may be sealed with the filtering unit 117 such that the air outputted at the outlet 113 may be fully filtered by the filtering unit 117. In some other examples, the filtering unit 117 may be disposed inside the inlet chamber 107, that is, air may be filtered and then outputted at the outlet 113. Those skilled in this art should appreciate the positions of the inlet chamber 107, the air pumping unit 115 and the filtering unit 117 are illustrative or exemplary and not restrictive.

In operation, the air purification apparatus 100 may operate under Mode 1 or 2 according to the indoor and outdoor air conditions. For example, when the indoor air quality is better than the outdoor air quality, the air purification apparatus 100 may be switched to operate under Mode 2, automatically or in response to a manual instruction, to further purify the indoor air. On the contrary, when the outdoor air quality is better than the indoor air quality, the air purification apparatus 100 may be switched to operate under Mode 1, automatically or in response to a manual instruction, to introduce fresh air in the outdoor space 105 into the indoor space 103. Accordingly, the air purification apparatus 100 may further comprise an air condition sensor (not shown) for sensing air condition of the indoor space and the outdoor space, and a first controller (not shown) for controlling the actuator to seal the first inlet 109 or the second inlet 111 according to the sensed air condition. The sensor may be disposed both in the indoor space and in the outdoor space, for example, disposed at the first inlet 109 and at the second inlet 111. The air condition sensor may be communicatively coupled to the first controller via a wire connection or a wireless connection to transmit the sensed air condition. The first controller may be implemented by hardware, software, firmware and/or any combination of hardware, software and/or firmware. For example, the first controller may be implemented by one or more circuit(s), programmable processor(s), ASIC(s), PLD(s), FPGA(s) or any other suitable devices.

In an example, the air condition sensor may comprise a sensing part for detecting a specific pollutant in the air, such as the micro particulate matters, the volatile organic compounds, or other types of pollutants. And the air condition sensor may send the measurement of the specific pollutant, such as the concentration of the pollutant, to the controller to represent the air condition in the air. In some other examples, the air condition sensor may comprise a plurality of sensing parts for detecting several types of pollutants in the air, respectively. Then the air condition sensor may send the measurements of the pollutants to the controller. The controller may further generate an index or indication representing the air condition according to the measurements of the pollutants using a specific algorithm. Then the controller may control the operation of the air purification apparatus 100 according to the generated index or indication. It will be readily appreciated that, the air condition sensor may use any existing detection methods to detect the pollutant in the air. For example, an electrochemical photo-ionization method can be used to detect the volatile organic compounds. A β-ray absorption method or a tapered element oscillating microbalance method can be used to detect the micro particulate matter in the air. It will be understood by those skilled in the art the examples of the detection method are merely illustrative and shall not limit the scope of the patent.

The first controller may also be configured to control the operation of other components of the air purification apparatus 100. For example, the first controller may be configured to control the working of the air pumping unit 115 according to the sensed air condition. Specifically, the first controller may indicate the air pumping unit 115 to operate faster or heavier when the indoor quality is bad, thereby enhancing the air flow rate through the air purification apparatus 100. The first controller may also indicate the air pumping unit 115 to turn off or operate slower when the outdoor wind is strong enough to form the air flow in the first air flow path 11 in FIG. 1.

In some embodiments, the air purification apparatus 100 may operate under Mode 1 or 2 according to the indoor and outdoor temperature. For example, the air purification apparatus 100 may further comprise a temperature sensor (not shown) for sensing air temperature of the indoor space 103 and the outdoor space 105 and a second controller (not shown) for controlling the actuator to seal the first inlet 109 or the second inlet 111 according to a temperature difference between the indoor space 103 and the outdoor space 105 or the like. For example, when the temperature difference between the indoor space 103 and the outdoor space 105 is lower than a first predetermined value or greater than a second predetermined value, the second controller may indicate the actuator to seal the first inlet 109, thereby keeping the outdoor air outside the indoor space 103. In some examples, the air purification apparatus 100 may further comprise an air conditioning unit (not shown), for adjusting the air temperature of the indoor space 103 according to the sensed air temperature. The air conditioning unit may be a heater or a cooler. For example, when the outdoor temperature is too high, the cooler may be turned on by the second controller to cool the air flowing therethrough. When the outdoor temperature is too low, the heater may be turned on by the second controller to heat the air flowing therethrough. In this way, the indoor temperature may be automatically maintained within a comfortable range for human beings. Similar to the first controller, the second controller may be implemented by hardware, software, firmware and/or any combination of hardware, software and/or firmware. For example, the second controller may be implemented by one or more circuit(s), programmable processor(s), ASIC(s), PLD(s), FPGA(s) or any other suitable devices. It will be readily appreciated that the second controller may be integrated with the first controller, or separate from the first controller.

From the foregoing, the air purification apparatus 100 can choose the outdoor air or the indoor air as its air source by selectively opening the first inlet 109 or the second inlet 111. Therefore, the consumers may control the air source of the air purification apparatus, which is particularly effective when the outdoor air quality is better than the indoor air quality. Moreover, it is easy to integrate such air purification apparatus into a window, and the cost for implementing such apparatus is low.

Figure 3:
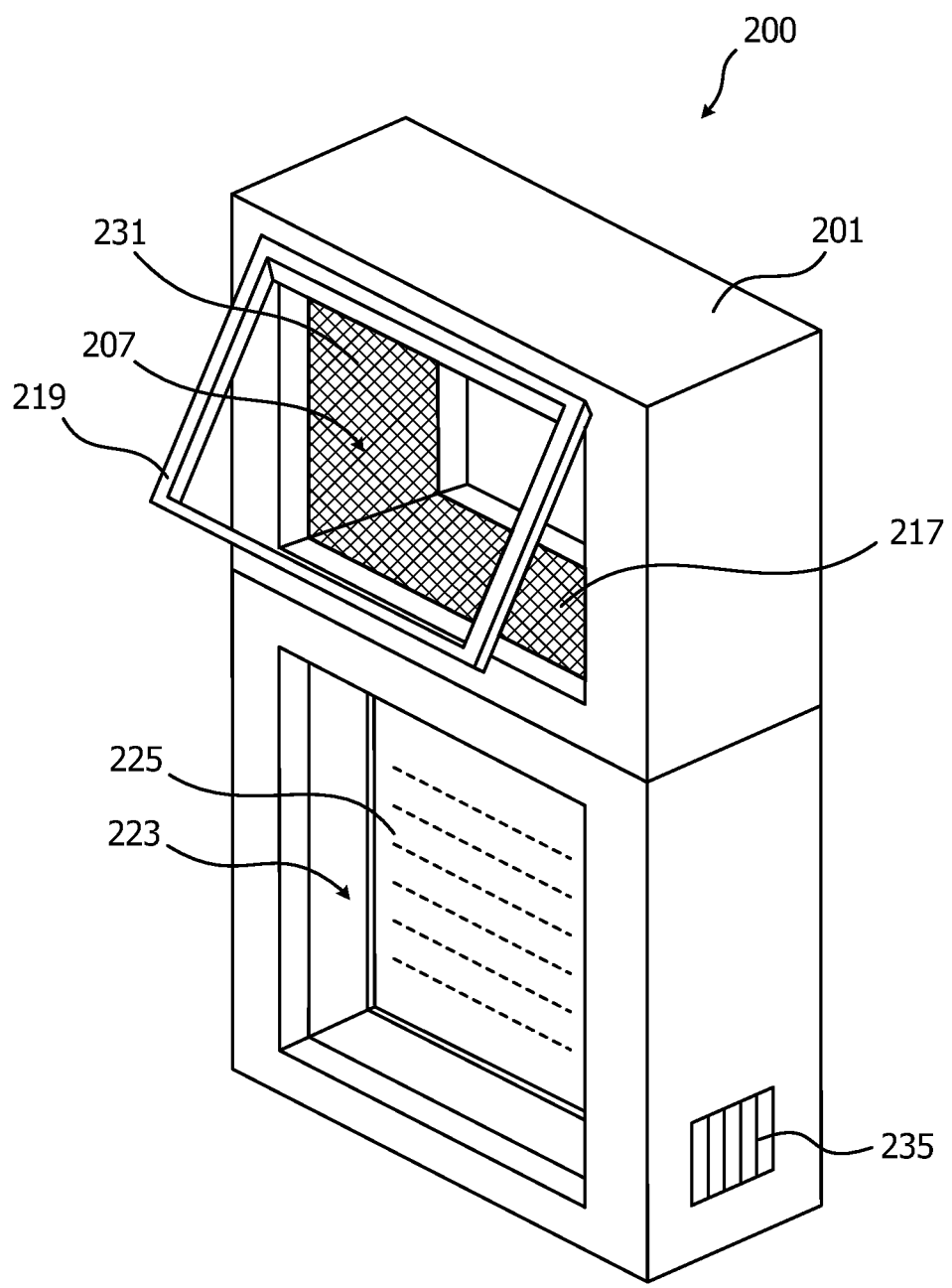
FIGS. 3-5 depict an air purification apparatus 200 according to another embodiment of the invention.
Figure 4:
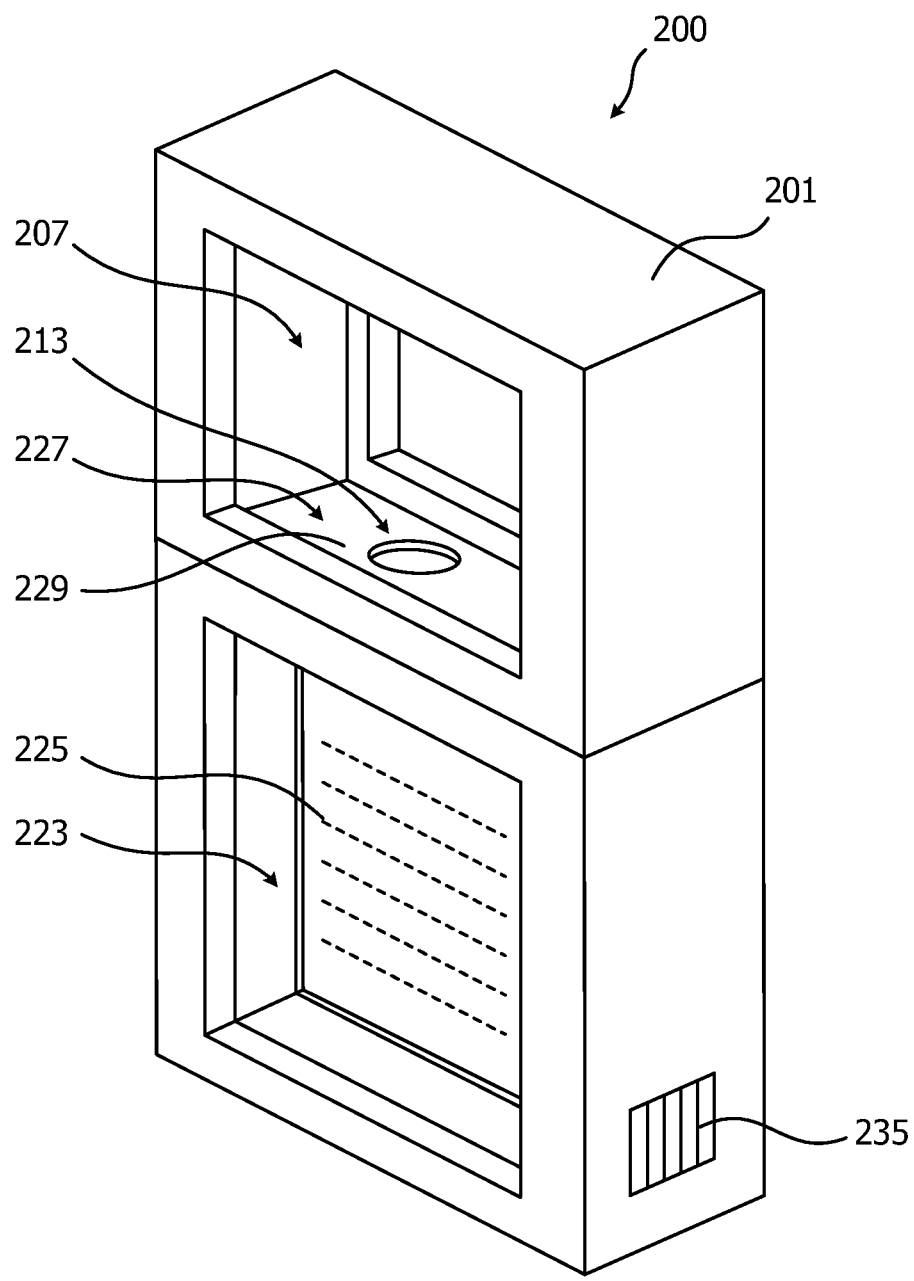
Figure 5:
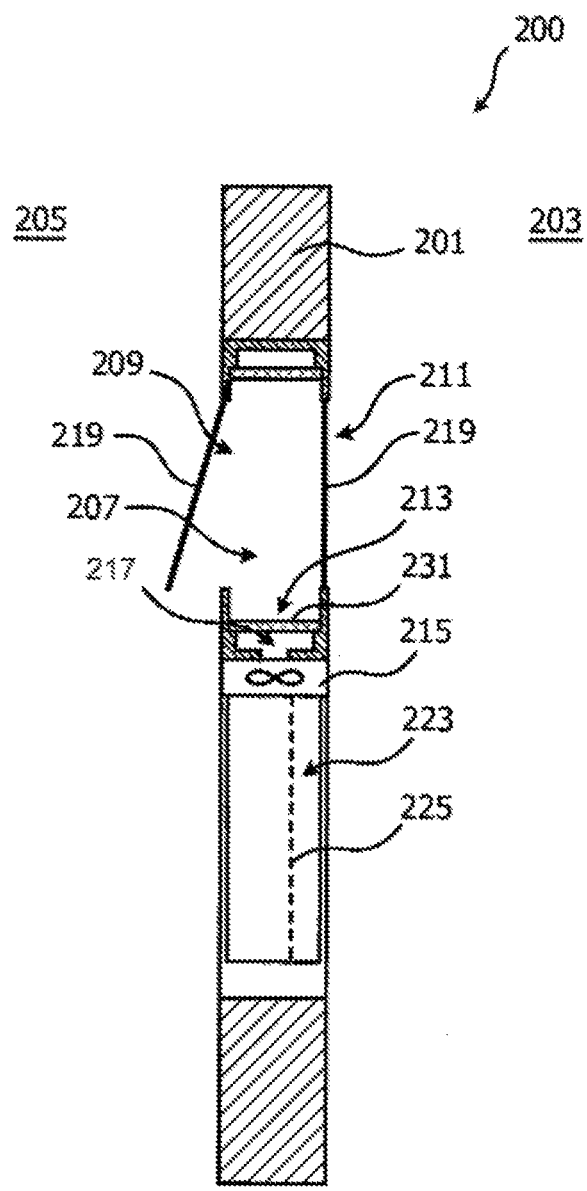

FIGS. 3-5 depict an air purification apparatus 200 according to another embodiment of the invention; wherein FIGS. 3 and 4 depict perspective views of the air purification apparatus 200, and FIG. 5 depicts a cross-sectional view of the air purification apparatus 200.

As depicted in FIGS. 3-5, the air purification apparatus 200 is formed as a window 201 or a portion thereof, for separating an indoor space 203 and an outdoor space 205. The apparatus 200 comprises:

an inlet chamber 207 having a first inlet 209, a second inlet 211 and an outlet 213, wherein the first inlet 209 is operatively open to the outdoor space 205 and the second inlet 211 is operatively open to the indoor space 203;

an air pumping unit 215 for pumping air from the inlet chamber 207 to the indoor space 203 through the outlet 213, wherein the air is pumped into the inlet chamber 207 through the first inlet 209 or through the second inlet 211;

a filtering unit 217 disposed upstream of the air pumping unit 215, for filtering pollutants in the air; and an outlet chamber 223 disposed downstream of the air pumping unit 215, wherein the outlet chamber 223 has a noise reduce 225 for reducing noise when the air is pumped into the indoor space 203 through the outlet chamber 223.

It should be noted that, in order to describe the internal structure of the inlet chamber 207 more clearly, the filtering unit 217 and a first covering unit 219 in FIG. 3 is omitted in FIG. 4.

As depicted in FIGS. 4 and 5, the inlet chamber 207 has a groove 227 on at least a portion of its inner wall 229, and the filter unit 217 has a filter screen 231 covering the groove 227 to form an air channel in fluid communication with the outlet 213. In some examples, the air channel may be formed all around or on most of the inner wall 229 of the inlet chamber 207 instead of merely on one side of the inlet chamber 207 (i.e. the filter screen 231 is directly covered on the outlet 213), thereby increasing the exposure area of its surface in the air flow path. The load and flow resistance of the filter screen 231 can be reduced by increasing its exposure area in the air flow path. Accordingly, the pressure drop of the filter screen 231 for obtaining a predefined flow rate can be significantly reduced, the predefined flow rate is required by ventilation of the indoor space. For the air pumping unit 215, such as an axial fan, the lower pressure drop requirement brings the advantages of lower rotating speed and lower power consumption. Therefore, it is much easier to implement such air purification apparatus 200 in a window or similar places where the size of the air pumping unit 215 is limited. Moreover, as the required rotating speed of the axial fan or other air pumping unit 215 is lower, the noise generated from its rotation or other similar motion can be reduced to avoid unfavourable disturbance on people in the indoor space.

In some embodiments, the filter screen 231 may be disposed on a top side and/or a lateral side of the inner wall 229 of the inlet chamber 207, leaving the rest of the groove 227 hidden under a metal plate, a plastic plate or other water-proofing structures. In some examples, the water proofing structure may be integrally formed with the inner wall 229 of the inlet chamber 207. For example, the inlet chamber 207 is shaped as cuboid, and then the filter screen 231 may be disposed on the top side and/or two lateral sides of the rectangular inner wall 229 of the inlet chamber 207. It should be noted that, the portion of the groove 227 covered with the filter screen 231 is fluidly communicated with the other portion of the groove 227 uncovered with the filtering screen 231 such that the air channel is still in fluid communication with the outlet 213 of the inlet chamber 211. As the filter screen 231 is not disposed on the bottom side of the inner wall 229, raindrops will not fall onto the filter screen 231 and then accumulate thereon, thereby preventing the filter screen 231 from water corrosion.

In some examples, the filter screen 231 may be detachable from the inlet chamber 207, such that it is easy to make replacement for the filter screen 231 when necessary, for example, after a period of use. The screen 231 may be moved from or into the inlet chamber 207 through the first inlet 209 or the second inlet 211. For example, the filter screen 231 may be formed a bit smaller than the inner wall 229 of the inlet chamber 207, and some flexible material such as sponge or rubber may be arranged on the periphery of the filter screen 231, which pads and seals the gap between the filter screen 231 and the inner wall 229 to support the filter screen 231 inside the inner wall 229. Moreover, as the gap between the filter screen 231 and the inner wall 229 is sealed with the flexible material, there will be no air leakage through the gap when the air purification apparatus 200 is working.

The outlet chamber 223 is disposed downstream of the air pumping unit 215. And the air pumping unit 215 is disposed between the inlet chamber 207 and the outlet chamber 223. The air pumped out of the inlet chamber 207 will travel through the outlet chamber 223 before pumped into the indoor space 203. The outlet chamber 223 provides space for receiving the noise reducer 225. For example, the noise reducer 225 may be a glass plate with a plurality of penetrated holes. The plurality of penetrated holes may be in a regular pattern to absorb sound waves. In this way, the air purification apparatus 200 will produce significantly small noise in operation. It will be readily appreciated that the noise reducers 225 may be other suitable sound absorbing or insulating structures.

As depicted in FIGS. 3 and 4, the air purification apparatus 200 may be installed in a wall with a portion thereof protruding from the wall. Therefore, a vent port 235 of the outlet chamber 223 may be disposed on the peripheral frame of the outlet chamber 223, and configured to discharge the purified air in the outlet chamber 223 into the indoor space 203. In some embodiments, the vent port 235 may be disposed on the lateral side, the bottom side, or any other suitable positions of the outlet chamber 223.

Figure 6:
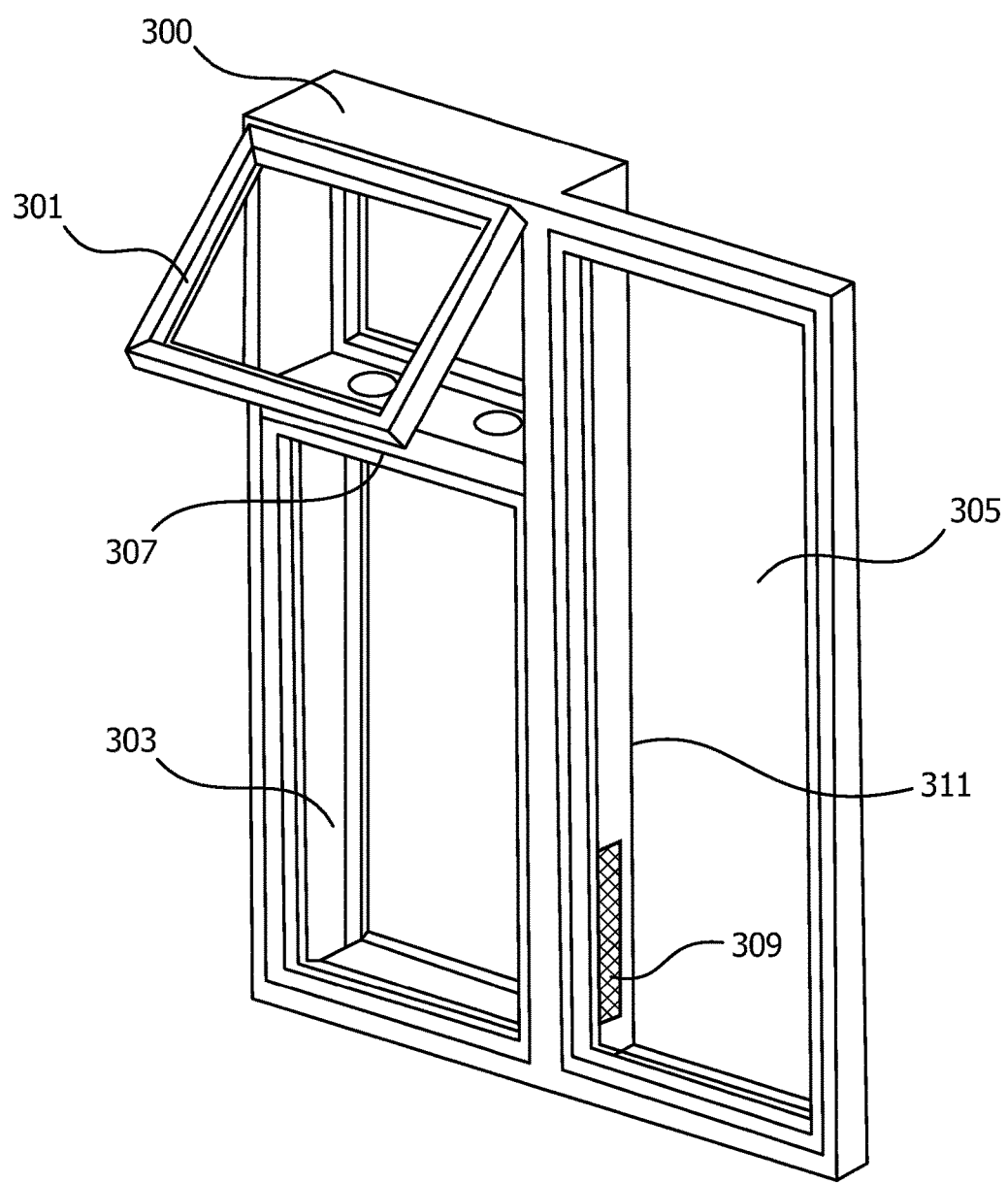
FIGS. 6-8 depict exemplary windows fit for installing air purification apparatuses according some embodiments of the invention.
Figure 7:
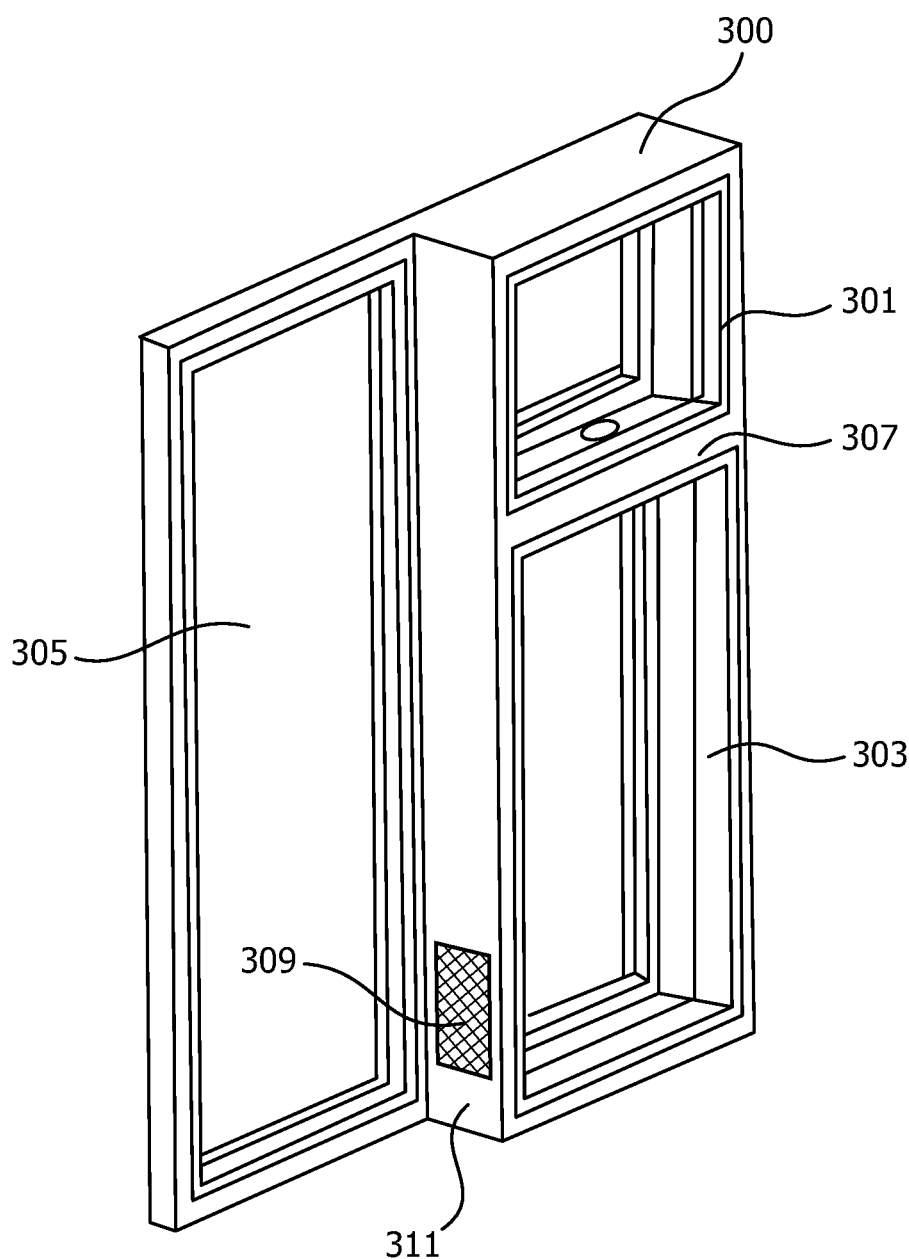

FIGS. 6-7 depict an exemplary window 300 fit for installing an air purification apparatus according an embodiment of the invention, wherein FIG. 6 depicts a top view of the exemplary window 300 from the outdoor space, and FIG. 7 depicts the top view of the exemplary window 300 from the indoor space.

As depicted in FIGS. 6-7, the window 300 comprises three window sashes 301, 303 and 305, wherein the window sashes 301 and 303 are vertically configured. The window sashes 301 and 303 are mainly consisted of double-wall glass, which constitute an inlet chamber and an outlet chamber of the air purification apparatus respectively. Moreover, one glass wall of the window sash 301 may be operatively rotated or moved outward to open or close a first inlet of the inlet chamber; and the other glass wall of the window sash 301 may be operatively rotated or moved inward to open or close a second inlet of the inlet chamber.

An air pumping unit (not shown) is disposed inside a window frame 307 between the window sash 301 and 303. An outlet of the inlet chamber 301 is disposed on the topside of the window frame 307, and the bottom side of the window frame 307 is open to the window sash 303 to fluidly couple the window sash 301 and 303, i.e. the inlet chamber and the outlet chamber. A filtering unit (not shown) of the air purification apparatus may be disposed inside the inlet chamber or the window frame 307. A vent port 309 may be disposed be on the lateral side of the outlet chamber (i.e. the window sash 303) and through a window frame 311, which permits the purified air to be pumped into the indoor space.

Figure 8:
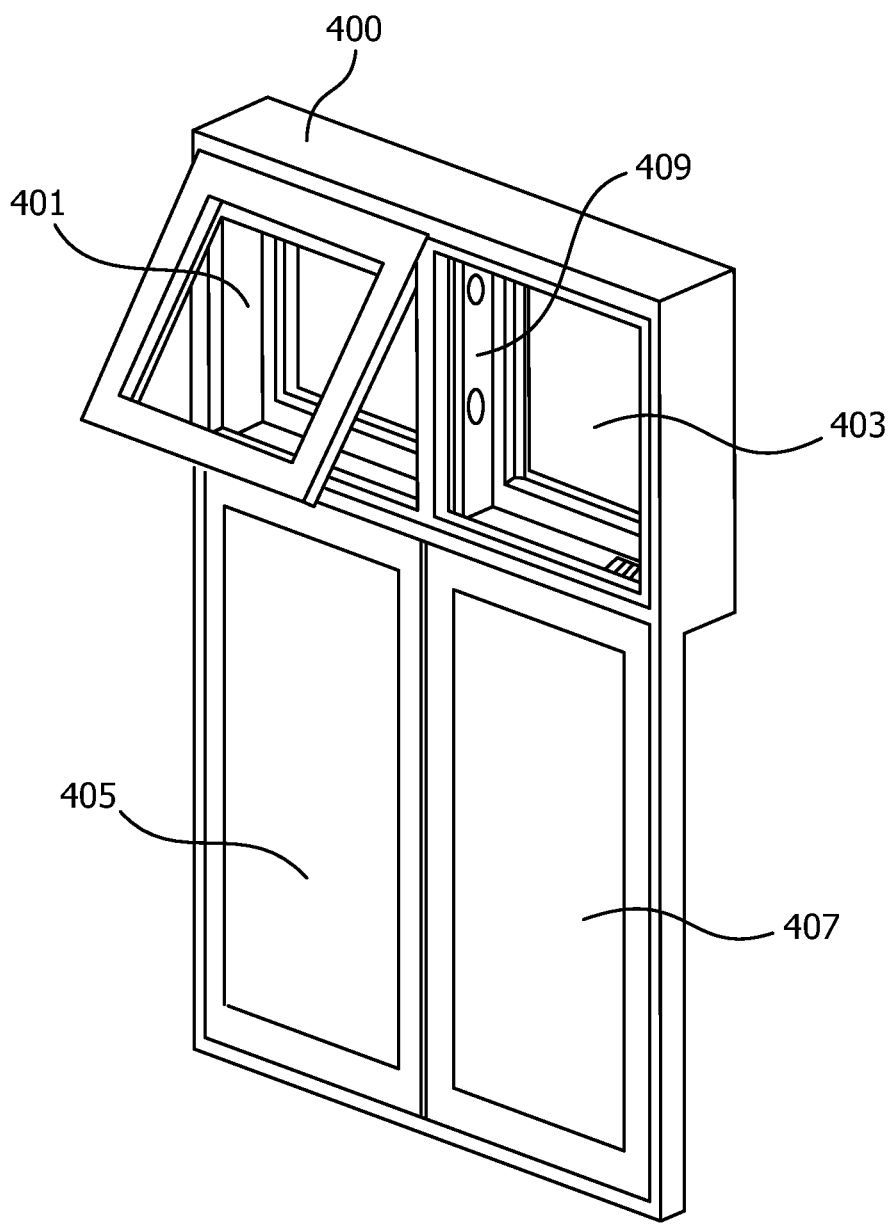

It will be readily appreciated that the structure of the windows 300 is merely illustrative and not limited, some other window structures may be used to install or integrate the air purification apparatus according to embodiments of the present invention. FIG. 8 depicts a top view of another exemplary window 400 fit for installing an air purification apparatus according an embodiment of the invention.

As depicted in FIG. 8, the window 400 comprises four window sashes 401, 403, 405 and 407, wherein the window sashes 401 and 403 are horizontally configured. Moreover, the window sashes 401 and 403 are mainly consisted of double-wall glass, which constitute an inlet chamber and an outlet chamber of the air purification apparatus respectively. Moreover, one glass wall of the window sash 401 may be operatively rotated or moved outward to open or close a first inlet of the inlet chamber; and the other glass wall of the window sash 401 may be operatively rotated or moved inward to open or close a second inlet of the inlet chamber. An air pumping unit and a filtering unit (not shown) of the air purification apparatus may be disposed inside a window frame 409 between the window sash 401 and 403.

While the invention has been illustrated and described in detail in the drawings and foregoing description, such illustration are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. An air purification apparatus, which is disposed in a window for separating an indoor space and an outdoor space, the apparatus comprising:
   an inlet chamber having a first inlet, a second inlet and an outlet, wherein the first inlet is configured to be operatively open to the outdoor space and the second inlet is configured to be operatively open to the indoor space and wherein the first inlet and the second inlet are arranged on opposing facing walls of the inlet chamber, and wherein the first inlet and the second inlet are configured to be individually selectable as air sources to import air directly into the inlet chamber;
   an air pumping unit configured to pump the air from the inlet chamber to the indoor space through the outlet, wherein the air is pumped into the inlet chamber through the first inlet or through the second inlet, the air pumping unit being disposed outside of the inlet chamber, downstream of the outlet, and the air pumping unit being in communication with the outlet of the inlet chamber;
   a filtering unit disposed upstream of the air pumping unit and configured to receive the air from the individually selectable first and second inlets, and configured to filter pollutants in the air received from the individually selectable first and second inlets;
   an air condition sensor configured to sense air condition of the indoor space and the outdoor space; and
   a first controller configured to control an actuator to seal the first inlet or the second inlet according to the sensed air condition.

2. An air purification apparatus as claimed in claim 1, wherein the inlet chamber has a groove on at least a portion of its inner wall, and the filtering unit has a filter screen covering the groove to form an air channel in fluid communication with the outlet.

3. An air purification apparatus as claimed in claim 2, wherein the filter screen is a HEPA filter.

4. An air purification apparatus as claimed in claim 2, wherein the filter screen is disposed on a top side and/or a lateral side of the inner wall of the inlet chamber.

5. An air purification apparatus as claimed in claim 1, wherein the air pumping unit is a centrifugal fan or an axial fan.

6. An air purification apparatus as claimed in claim 1, further comprising:
   an outlet chamber disposed downstream of the air pumping unit, wherein the outlet chamber comprises a noise reducer configured to reduce noise when the air is pumped into the indoor space through the outlet chamber.

7. An air purification apparatus as claimed in claim 6, wherein the air pumping unit is disposed between the inlet chamber and the outlet chamber.

8. An air purification apparatus as claimed in claim 1, further comprising:
   a first cover configured to operatively seal the first inlet; and
   a second cover configured to operatively seal the second inlet,
   wherein the actuator is configured to operatively drive the first cover to seal the first inlet and to operatively drive the second cover to seal the second inlet.

9. An air purification apparatus as claimed in claim 1, wherein the first controller is further configured to control working of the air pumping unit according to the sensed air condition.

10. An air purification apparatus as claimed in claim 9, further comprising:
    a temperature sensor configured to sense air temperatures of the indoor space and the outdoor space, and
    a second controller configured to control the actuator to seal the first inlet or the second inlet according to a temperature difference between the indoor space and the outdoor space.

11. An air purification apparatus as claimed in claim 10, further comprising:
    an air conditioning unit configured to adjust the air temperature of the indoor space according to the sensed air temperature.

12. The air purification apparatus of claim 1, wherein the air condition sensor is communicatively coupled to the first controller via a wire connection or a wireless connection to transmit the sensed air condition.

13. The air purification apparatus of claim 1, wherein the air condition sensor comprises a sensing part configured to detect a specific pollutant in the air.

14. The air purification apparatus of claim 1, wherein the air condition sensor comprises a plurality of sensing parts configured to detect a plurality of pollutants in the air.

15. The air purification apparatus of claim 1, wherein the first controller is configured to generate an index or an indication representing the air condition according to measurements of the pollutants using a specific algorithm.

* * * * *